United States Patent
Dwarakanath et al.

(10) Patent No.: US 7,038,438 B2
(45) Date of Patent: May 2, 2006

(54) CONTROLLER FOR A POWER CONVERTER AND A METHOD OF CONTROLLING A SWITCH THEREOF

(75) Inventors: Mirmira Ramarao Dwarakanath, Somerset, NJ (US); Jue Wang, Union, NJ (US); Harry Thomas Weston, Union, NJ (US)

(73) Assignee: Enpirion, Inc., Bridgewater, NJ (US)

( * ) Notice: Subject to any disclaimer, the term of this patent is extended or adjusted under 35 U.S.C. 154(b) by 0 days.

(21) Appl. No.: 10/767,937

(22) Filed: Jan. 29, 2004

(65) Prior Publication Data

US 2005/0169024 A1 Aug. 4, 2005

(51) Int. Cl.
G05F 1/40 (2006.01)

(52) U.S. Cl. .................. 323/283; 323/285; 363/46

(58) Field of Classification Search .................. 363/46, 363/48, 56.1, 41; 323/282–288, 222, 351, 323/272, 241; 327/105, 106
See application file for complete search history.

(56) References Cited

U.S. PATENT DOCUMENTS

| | | |
|---|---|---|
| 5,285,369 A | 2/1994 | Balakrishnan |
| 5,469,334 A | 11/1995 | Balakrishnan |
| 5,689,213 A | 11/1997 | Sher |
| 6,005,377 A | 12/1999 | Chen et al. |
| 6,118,351 A | 9/2000 | Kossives et al. |
| 6,255,714 B1 | 7/2001 | Kossives et al. |
| 6,495,019 B1 | 12/2002 | Filas et al. |
| 6,541,819 B1 | 4/2003 | Lotfi et al. |
| 6,791,305 B1 | 9/2004 | Imal et al. |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Cancun, Mexico, pp. 72-74, Jul., 1997.

Goodman, J. et al., "An Energy/Security Scalable Encryption Processor Using an Embedded Variable Voltage DC/DC Converter," IEEE Journal of Solid-State Circuits, vol. 33, No. 11 (Nov. 1998).

Horowitz, P., et al., "The Art of Electronics," Second Edition, 1989, pp. 288-291, Cambridge University Press, Cambridge, MA.

Lotfi, A.W., et al., "Issues and Advances in High-Frequency Magnetics for Switching Power Supplies," Proceedings of the IEEE, Jun. 2001, vol. 89, No. 6, pp. 833-845.

*Primary Examiner*—Rajnikant B. Patel
(74) *Attorney, Agent, or Firm*—Slater & Matsil, L.L.P.

(57) ABSTRACT

A controller for, related method of controlling a switch of, a power converter and a power converter employing the same. The controller is employable with a power converter including a switch of a power train configured to conduct for a duty cycle and provide a regulated output characteristic at an output thereof. In one embodiment, the controller includes a sparse analog-to-digital converter configured to determine a difference between the output characteristic and a desired characteristic and provide an error signal representing the difference in discrete steps. A magnitude of the discrete steps is small when the difference is small and the magnitude of the discrete steps is larger when the difference is larger. The controller also includes a duty cycle processor configured to provide a digital duty cycle signal to control the duty cycle of the switch as a function of the error signal.

20 Claims, 2 Drawing Sheets

CONTROLLER FOR A POWER CONVERTER AND A METHOD OF CONTROLLING A SWITCH THEREOF

TECHNICAL FIELD

The present invention is directed, in general, to power electronics and, more specifically, to a controller for a power converter, method of controlling a duty cycle of a switch of the power converter, and a power converter employing the same.

BACKGROUND

A switch mode power converter (also referred to as a "power converter") is a power supply or power processing circuit that converts an input voltage waveform into a specified output voltage waveform. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage) of the power converter and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50 percent). Additionally, as the needs for systems such as a microprocessor powered by the power converter dynamically change (e.g., as a computational load on the microprocessor changes), the controller should be configured to dynamically increase or decrease the duty cycle of the switches therein to maintain the output characteristic at a desired value.

For the most part, controllers associated with the power converters have primarily been composed of interconnected analog circuits. Analog circuitry, however, is undesirable for numerous reasons as set forth below. First, analog controllers can require a multitude of interconnected discrete components to obtain a desired functionality of a single controller, which translates into large inventory costs, and more complicated and expensive manufacturing processes. The analog controllers also tend to take up a fairly extensive footprint of the power converters to accommodate the numerous discrete components therein. With a trend toward smaller power converters that parallels an increased level of integration with the loads powered thereby, employing a larger footprint for the controller necessitated by the numerous discrete components that are not easily reduced in size by circuit integration is disadvantageous.

Additionally, analog hardware is generally fixed and inflexible thereby making modifications thereto very difficult, if not impossible, without a complete redesign of the controller. Analog circuitry is also subject to packaging and component defects, especially as the number of components increases, and analog circuitry tends to be sensitive to noise leading to further defects therein. As is evident from the foregoing, analog controllers suffer from several drawbacks that inhibit the effectiveness thereof. Despite the numerous limitations of analog circuitry, however, the analog controllers have been the controllers of choice for use with a majority of commercially available power converters today.

Looking at the alternatives to analog controllers, controllers employing digital circuitry have been successfully employed in lieu of analog controllers in power converters servicing lower speed or slower response applications (e.g., response times in a range of two to 100 milliseconds) such as uninterruptible power supplies, motor drives and three-phase rectifiers. The controllers employing digital circuitry that control power converters servicing such applications can generally execute the necessary commands in an allotted amount of time consistent with the respective application.

To date, however, controllers employing digital circuitry for use with power converters powering sensitive loads such as high performance microprocessors have not been viable alternatives to analog controllers due, in part, to a necessity for faster control loops and tighter budgetary constraints. A typical commercial AC-to-DC or DC-to-DC power converter demands response times of approximately 20 microseconds or less with closed control loop bandwidth requirements in a range of five to 100 kilohertz. The controllers for the power converters should also account for sampling within a switching cycle, which is typically two orders of magnitude faster than the lower speed applications mentioned above. The fast response times are presently attainable by controllers employing analog circuitry. Cost effective digital signal processors are generally not capable of meeting the wide bandwidth requirements in the control loops to meet the fast transient response times and high switching frequencies of the power converters.

Moreover, overcoming the aforementioned limitations may induce cost prohibitive processor designs, when compared to the cost of analog controllers. For instance, a 60 watt DC-to-DC power converter with analog control circuitry may cost around $35, whereas the cost of a digital signal processor alone for the power converter may cost around $15, which is a substantial cost for the control function by itself. A controller incorporating a high performance digital signal processor has, in the past, been too expensive for use with the power converters when compared to the lower cost analog controller.

It is recognized that a significant contributor to a complexity of digital processing and the related computational delays in the digital processing of control signals is a substitution of digital circuitry in the controller for corresponding analog processes. An example of such a substitution is sensing and converting an analog signal such as the output characteristic (e.g., the output voltage) with sufficient accuracy and speed into a digital format for use with the digital circuitry in the controller. The inverse process of a digital to analog conversion is less complex and, often times, can be performed expeditiously with an "R-2R" resistor ladder and an operational amplifier. The process of analog to digital conversion, however, generally uses techniques such as "successive approximation" that employ a significant amount of time for iterative processing. The process of analog to digital conversion may also use "flash conversions" that employ significant circuitry to perform the necessary tasks in an acceptable time period, or ramp generators and counters that take a significant amount of time to perform the conversion function. The aforementioned complexities all contribute either individually or in combination to the complexity of the controller employing digital circuitry.

Another significant contributor to a complexity of digital processing and the related computational delays in the digital processing of control signals is the signal processing necessary to produce a duty cycle for the switches of the power converter after the input signals are converted into a digital format. This process is frequently performed with a microprocessor or a digital signal processor. Again, either circuit complexity with attendant cost for high performance circuitry or the computational delays of lower performance circuitry is a consequence of substituting digital processing for otherwise conventional analog processes.

The use of controllers employing digital circuitry in power supplies has been the subject of many references including U.S. Pat. No. 6,005,377 entitled "Programmable Digital Controller for Switch Mode Power Conversion and Power Supply Employing the Same," to Chen, et al. ("Chen"), issued Dec. 21, 1999, which is incorporated herein by reference. Chen discloses a programmable controller that operates in a digital domain without reliance on operational software or internal analog circuitry to control a switch of a power converter. In an exemplary embodiment, the controller is embodied in a field programmable gate array with the ability to handle numerous functions simultaneously and in parallel, as opposed to a digital signal processor which handles instructions serially. Thus, the controllers of Chen can handle bandwidths greater than or equivalent to analog controllers in the range of five to 100 kilohertz. (Column 2, lines 43–57).

As mentioned above, while there has been considerable attention and some improvement in controllers employing digital circuitry (see, for instance, Chen mentioned above) for use with the power converters, there is still an opportunity for improvement in the controllers, especially in view of the more stringent demands on the power converters. Accordingly, what is needed in the art is a controller for the power converters, and a method of operation thereof, that takes advantage of the benefits associated with digital control circuitry, while overcoming circuit complexity or delay in the processing of the control signals that have disadvantageously afflicted controllers of the past. In accordance therewith, what is needed in the art is a controller that can efficiently modify the duty cycle of the switches of the power converter to maintain an output characteristic about a desired value and, at the same time, meet the more exacting demands imposed on the power converters.

SUMMARY OF THE INVENTION

These and other problems are generally solved or circumvented, and technical advantages are generally achieved, by advantageous embodiments of the present invention which includes a controller for use with a power train of a power converter including a switch configured to conduct for a duty cycle and provide a regulated output characteristic at an output thereof. In one embodiment, the controller includes a sparse analog-to-digital converter configured to determine a difference between the output characteristic and a desired characteristic and provide an error signal representing the difference in discrete steps. A magnitude of the discrete steps is small when the difference is small and the magnitude of the discrete steps is larger when the difference is larger. The controller also includes a duty cycle processor configured to provide a digital duty cycle signal to control the duty cycle of the switch as a function of the error signal.

In another aspect, the present invention provides a method of controlling a duty cycle of a switch to provide a regulated output characteristic at an output of a power converter. In one embodiment, the method includes measuring a difference between the output characteristic and a desired characteristic and providing an error signal representing the difference in discrete steps. A magnitude of the discrete steps is small when the difference is small and a magnitude of the discrete steps is larger when the difference is larger. The method also includes providing a digital duty cycle signal to control the duty cycle of the switch as a function of the error signal.

In yet another aspect, the present invention provides a power converter including, in one embodiment, a power train having a switch configured to conduct for a duty cycle and provide a regulated output characteristic at an output of the power converter. The power converter also includes a controller having a sparse analog-to-digital converter configured to determine a difference between the output characteristic and a desired characteristic and provide an error signal representing the difference in discrete steps. A magnitude of the discrete steps is small when the difference is small and a magnitude of the discrete steps is larger when the difference is larger. The controller also includes a duty cycle processor configured to provide a digital duty cycle signal to control the duty cycle of the switch as a function of the error signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely, a controller for a power converter, method of operation thereof and a power converter employing the same. The principles of the present invention, however, may also be applied to all types of power supplies employing various conversion topologies that may benefit from a controller employing digital circuitry. The advantages associated with the controller and power converter further exploit the benefits associated with the application of digital systems in electronic devices.

Figure 1:
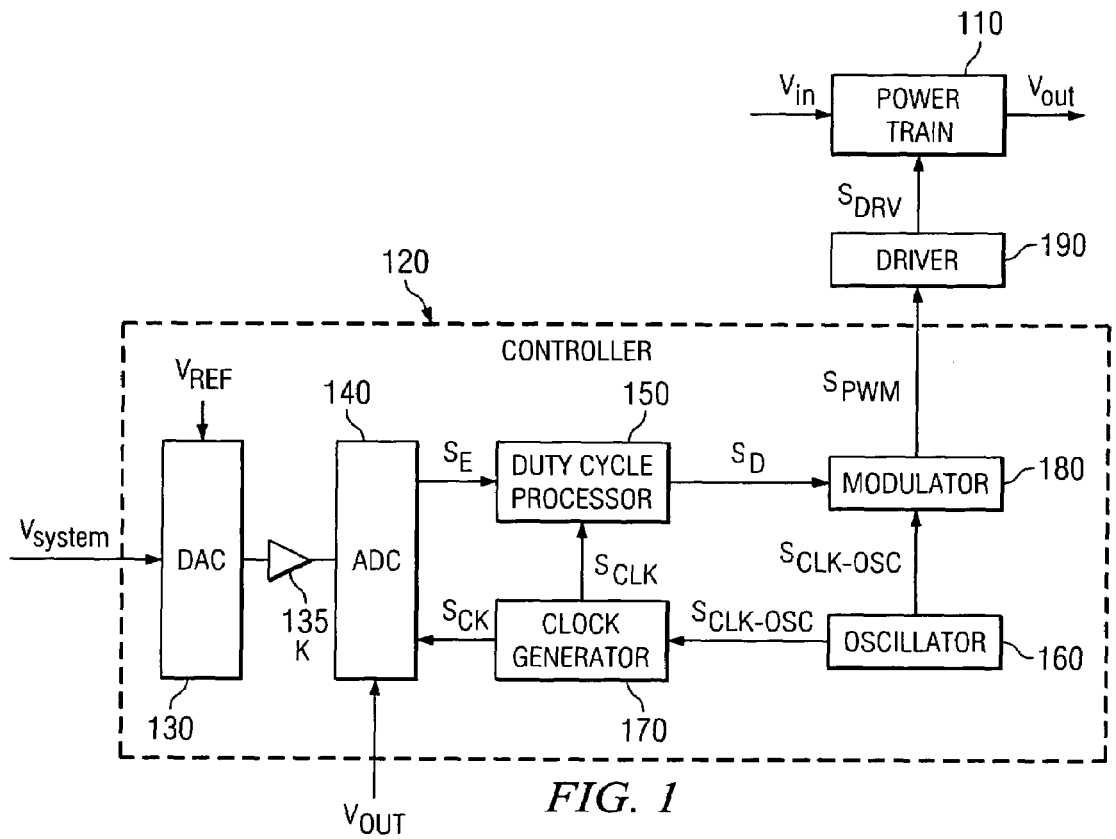
FIG. 1 illustrates a block diagram of an embodiment of a power converter constructed according to the principles of the present invention.

Referring initially to FIG. 1, illustrated is a block diagram of an embodiment of a power converter constructed according to the principles of the present invention. The power converter includes a power train 110, a controller 120 and a driver 190, and provides power to a system such as a microprocessor. The power train 110 may employ a buck converter topology as illustrated and described with respect to FIG. 2 below. Of course, any number of converter topologies may benefit from the use of a controller 120 constructed according to the principles of the present invention and are well within the broad scope of the present invention.

The power train 110 receives an input voltage $V_{in}$ at an input thereof as a power source and provides a regulated output characteristic (e.g., an output voltage) $V_{out}$ to power a microprocessor or other load coupled to an output of the power converter. The controller 120 receives a digital word representing a desired characteristic such as a desired system voltage $V_{system}$ from an internal or external source associated with the microprocessor, and the output voltage $V_{out}$ of the power converter. In accordance with the aforementioned characteristics, the controller 120 provides a signal to control a duty cycle and a frequency of at least one switch of the power train 110 to regulate the output voltage $V_{out}$ thereof.

The controller 120 includes a digital-to-analog converter ("DAC") 130 that receives a reference voltage $V_{REF}$ and transforms the desired system voltage $V_{system}$ in the form of a digital word or format into an analog equivalent (i.e., an analog format). The reference voltage $V_{REF}$ provides a reference for a calibration of the digital-to-analog conversion process associated with the DAC 130. The analog format of the desired system voltage $V_{system}$ is then amplified with a gain K, if necessary, by an operational amplifier 135. A sparse analog-to-digital converter ("ADC") 140 of the controller 120 employs the analog format of the desired system voltage $V_{system}$ and the output voltage $V_{out}$ to provide an error signal $S_E$ to a duty cycle processor 150. The error signal $S_E$ typically is in the form of a series of binary error signals (also referred to as "$E_1, \ldots E_n$") and represents a difference between the output voltage $V_{out}$ of the power converter and the desired system voltage $V_{system}$ in discrete steps. A magnitude of the discrete steps of the error signal $S_E$ is small when the difference is small and a magnitude of the discrete steps of the error signal $S_E$ is larger when the difference is larger.

Thus, the sparse ADC 140 determines a difference between the output voltage $V_{out}$ and the desired system voltage $V_{system}$ and provides the error signal $S_E$ therefrom. The duty cycle processor 150 then employs the error signal $S_E$ to provide a digital duty cycle signal $S_D$ (e.g., an eight bit digital signal representing a duty cycle) to control a duty cycle of at least one switch of the power converter.

The duty cycle processor 150 is coupled to a modulator 180 [e.g., a pulse width modulator ("PWM")] that converts the digital duty cycle signal $S_D$ from the duty cycle processor 150 into a signal so that the driver 190 (e.g., a gate driver) can control at least one switch of the power converter. An operation of the duty cycle processor 150 is gated by a clock signal $S_{CLK}$ provided by a clock generator 170. The clock generator 170 also provides another clock signal $S_{CK}$ for the sparse ADC 140, which may be shifted in phase as compared to the clock signal $S_{CLK}$ for the duty cycle processor 150. A frequency of the clock signals $S_{CLK}$, $S_{CK}$ may be on the order of one thirty-second or one eighth of the switching frequency of the power converter.

The switching frequency of the modulator 180 is typically the same as the switching frequency of the power converter and is controlled by an oscillator (e.g., a ring oscillator) 160. The ring oscillator 160 also provides a high frequency clock signal $S_{CLK-OSC}$ to the clock generator 170, which is divided down to produce the clock signals $S_{CLK}$, $S_{CK}$. In accordance with the aforementioned characteristics, a drive signal(s) $S_{DRV}$ is provided by the driver 190 to control a duty cycle and a frequency of at least one switch of the power converter to regulate the output voltage $V_{out}$ thereof.

There are a number of design choices available for the modulator 180. For instance, a digital counter may be clocked by the ring oscilator 160. The modulator 180 reads the digital duty cycle signal $S_D$ from the duty cycle processor 150 and generates a high signal during a portion of the counting cycle that corresponds to a period when a switch of the power converter is being controlled to conduct, and a low signal otherwise. At the end of the counting cycle, the counter resets to zero. The ring oscillator 160 generates a clock signal $S_{CLK-OSC}$ that can facilitate fine duty cycle granularity or resolution by the modulator 180 thereby allowing accurate control, as necessary, of the output voltage $V_{out}$ of the power converter. Thus, the moduLator 180 supplies a signal that is typically constructed to form a pulse width modulated signal $S_{PWM}$ to control the duty cycle for at least one switch of the power converter. The pulse width modulated signal $S_{PWM}$ is then fed to the driver 190. Additionally, an embodiment of a modulator is disclosed in U.S. Patent Application Publication No. 2005/0168205, entitled "Controller for a Power Convener and Method of Controlling a Switch Thereof," to Dwarakanath, et al, which is incorporated herein by reference.

There are a number of viable alternatives to implement a driver 190 that include techniques to provide sufficient signal delays to prevent crosscurrents when controlling multiple switches in the power converter. Of course, any driver 190 capable of providing a drive signal $S_{DRV}$ to control a switch is well within the broad scope of the present invention. Additionally, an embodiment of a driver is disclosed in U.S. Patent Application Publication No. 2005/0168203, entitled "Driver for a Power Convener and Method of Driving a Switch Thereof," to Dwarakanath, et al., which is incorporated herein by reference.

Figure 2:
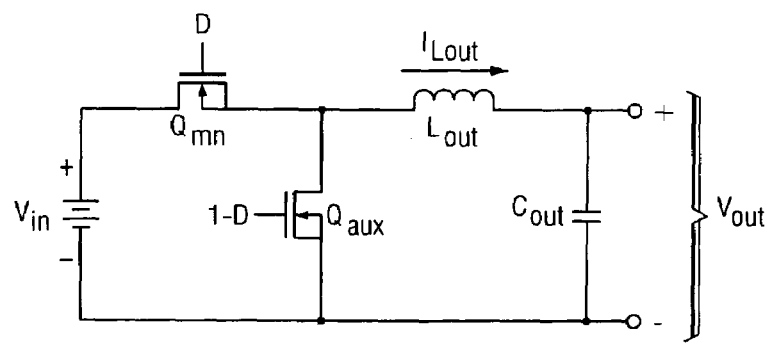
FIG. 2 illustrates a schematic diagram of an embodiment of a power train of a power converter constructed according to the principles of the present invention.

Turning now to FIG. 2, illustrated is a schematic diagram of an embodiment of a power train of a power converter constructed according to the principles of the present invention. While in the illustrated embodiment, the power train employs a buck converter topology, those skilled in the art should understand that other converter topologies such as a forward converter topology are well within the broad scope of the present invention.

The power train of the power converter receives an input voltage $V_{in}$ from a source of electrical power (represented by a battery) at an input thereof and provides a regulated output voltage $V_{out}$ to power, for instance, a microprocessor at an output of the power converter. In keeping with the principles of a buck converter topology, the output voltage $V_{out}$ is generally less than the input voltage $V_{in}$ such that a switching operation of the power converter can regulate the output voltage $V_{out}$. A main switch $Q_{mn}$ (e.g., a field effect transistor) is enabled to conduct for a primary interval (generally co-existent with a primary duty cycle "D" of the main switch $Q_{mn}$) and couples the input voltage $V_{in}$ to an output filter inductor $L_{out}$. During the primary interval, an inductor current $I_{Lout}$ flowing through the output filter inductor $L_{out}$ increases as a current flows from the input to the output of the power train. An AC component of the inductor current $I_{Lout}$ is filtered by the output capacitor $C_{out}$.

During a complementary interval (generally co-existent with a complementary duty cycle "1-D" of the main switch $Q_{mn}$), the main switch $Q_{mn}$ is transitioned to a non-conducting state and an auxiliary switch $Q_{aux}$ (e.g., a freewheeling field effect transistor or freewheeling diode) is enabled to conduct. The auxiliary switch $Q_{aux}$ provides a path to maintain a continuity of the inductor current $I_{Lout}$ flowing through the output filter inductor $L_{out}$. During the complementary interval, the inductor current $I_{Lout}$ through the output filter inductor $L_{out}$ decreases. In general, the duty cycle of the main and auxiliary switches $Q_{mn}$, $Q_{aux}$ may be adjusted to maintain a regulation of the output voltage $V_{out}$ of the power converter. Those skilled in the art should understand, however, that the conduction periods for the main and auxiliary switches $Q_{mn}$, $Q_{aux}$ may be separated by a small time interval to avoid cross conduction therebetween and beneficially to reduce the switching losses associated with the power converter.

As mentioned above, as the needs for the systems such as a microprocessor powered by the power converter dynamically change, a controller should be configured to dynamically increase or decrease the duty cycle of the main and auxiliary switches $Q_{mn}$, $Q_{aux}$ therein to maintain an output characteristic such as the output voltage $V_{out}$ at a desired value. For reasons that will become apparent, the controller constructed according to the principles of the present invention can maintain a well regulated output voltage $V_{out}$, even in view of an increase in demand on the systems such as microprocessors powered by the power converter.

Figure 3:
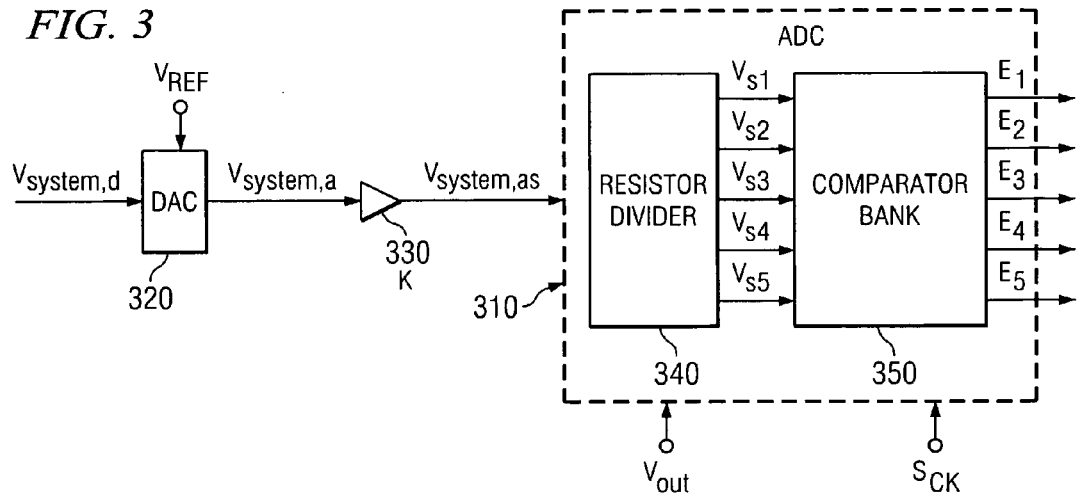
FIG. 3 illustrates a block diagram of portions of a controller including an embodiment of a sparse analog-to-digital converter constructed according to the principles of the present invention.

Turning now to FIG. 3, illustrated is a block diagram of portions of a controller including an embodiment of a sparse analog-to-digital converter ("ADC") 310 constructed according to the principles of the present invention. A DAC 320 and operational amplifier 330 analogous to the DAC 130 and operational amplifier 135 illustrated and described with respect to FIG. 1 are coupled to the sparse ADC 310. While a reference to the desired system voltage $V_{system}$ in FIG. 1 did not discriminate between the digital, analog and scaled formats thereof, the discussion that follows differentiates between the formats of a desired characteristic (e.g., the desired system voltage $V_{system}$) for purposes of clarity.

The DAC 320 operates on a digital format of a desired system voltage $V_{system,d}$, supplied from an internal or external source, representing a desired characteristic to produce an analog format of the desired system voltage $V_{system,a}$. Alternatively, an analog format of the desired system voltage $V_{system,a}$ may be supplied either from an internal or external source (not shown), without the need for digital to analog conversion. The analog format of the desired system voltage $V_{system,a}$ may be scaled by an operational amplifier 330 with a gain K to produce a scaled analog format of the desired system voltage $V_{system,as}$.

The scaled representations $V_{s1}, \ldots, V_{s5}$ are coupled to comparators of the comparator bank 350 that produce an error signal (designated as error signal $S_E$ in FIG. 1) represented by error signals $E_1, \ldots, E_5$. A timing of the comparators of the comparator bank 350 is controlled by a clock signal $S_{CK}$ similar to the another clock signal $S_{CK}$ illustrated and described with respect to FIG. 1. The error signals $E_1, \ldots, E_5$ digitally express an error between two signals, for instance, an output voltage $V_{out}$ of a power converter and a desired system voltage $V_{system}$. The error signals $E_1, \ldots, E_5$ typically represent unevenly spaced steps (i.e., discrete steps) in the output voltage $V_{out}$. The selection of resistor values for a resistor divider 340 to provide multiple scaled representations of an input signal are well known to those skilled in the art and in the interest of brevity will not hereinafter be described. Of course, the resistor divider 340 alternatively can be configured to provide an array of scaled representations $V_{s1}, \ldots, V_{s5}$ of the output voltage $V_{out}$ with preferably unevenly spaced scaling steps, and the scaled analog format of the desired system voltage $V_{system,as}$ may be coupled to the other inputs of the comparators of the comparator bank 350.

The sparse ADC 310 avoids conflicting design issues of circuit complexity or computational time delay associated with presently available analog to digital conversion techniques. The resulting generation of the cycle-to-cycle changes in duty cycle further avoids the corresponding complexity and computational time delay issues associated with further signal processing using microprocessors or digital signal processors. The result is a less complex digital control process for a power converter that can be readily fabricated as a low cost integrated circuit with ordinary integrated circuit processing techniques.

Figure 4:
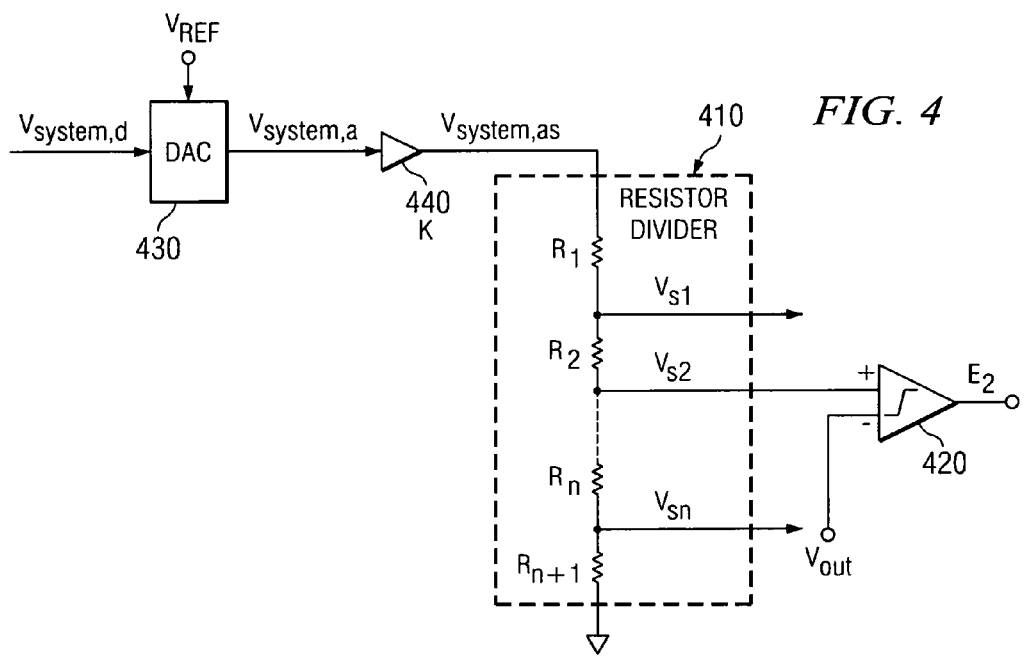
FIG. 4 illustrates a block diagram of portions of a sparse analog-to-digital converter including an embodiment of a resistor divider coupled to a comparator of a comparator bank constructed according to the principles of the present invention.

Turning now to FIG. 4, illustrated is a block diagram of portions of a sparse analog-to-digital converter ("ADC") including an embodiment of a resistor divider 410 coupled to a comparator 420 of a comparator bank constructed according to the principles of the present invention. A DAC 430 and operational amplifier 440 analogous to the DAC 130 and operational amplifier 135 illustrated and described with respect to FIG. 1 are coupled to the resistor divider 410 and provide a scaled analog format of a desired system voltage $V_{system,as}$ therefrom.

The resistor divider 410 generally produces scaled representations $V_{s1}, \ldots, V_{sn}$ of a reference voltage on the taps, each representing a scaled desired characteristic. The output characteristic of a power converter is coupled to the other inputs of the comparators. The taps of the resistor divider 410 are typically unevenly spaced so that an accurate estimate of the output characteristic can be made when the output characteristic of the power converter is close to the desired characteristic, and coarser estimates can be made when a greater deviation exists. For example, if the resistor divider 410 has five taps coupled to five comparators, then resistor values can be selected so that six output characteristic errors of one percent or less, five percent or less, or more than five percent can be recognized, including an indication of the sign of the error.

In the illustrated embodiment, the resistor divider 410 includes a plurality of resistors $R_1, \ldots, R_{n+1}$ and an exemplary tap adjacent the second resistor $R_2$ is coupled to a non-inverting input of the comparator 420 of the comparator bank. For the "n" scaled representations $V_{s1}, \ldots, V_n$, "n" comparators are employed in the comparator bank of a sparse ADC. The inverting input of the comparator 420 is coupled to another signal, for instance, an output voltage $V_{out}$ of a power converter (i.e., an output characteristic of the power converter). The comparator 420 produces an error signal $E_2$ indicating whether the output voltage $V_{out}$ is greater or less than a scaled representation $V_{s2}$ of the scaled analog format of the desired system voltage $V_{system,as}$. Of course, the polarity of the inputs to the comparators can be reversed with appropriate compensating inversion of the signal processing in another part of the controller.

In general, a comparator bank including a plurality of comparators generates an error signal(s) as described herein. The comparators and sparse ADC determine a difference between the output voltage $V_{out}$ of the power converter and a desired characteristic (e.g., a desired system voltage $V_{system}$), and provide the error signals therefrom. While the error signals are generally embodied as eight bit words or signals, words or signals employing fewer or greater bit lengths are well within the broad scope of the present invention. As will become more apparent in relation to the description of the FIGURE(s) that follow, a duty cycle processor includes a duty cycle encoder that produces a modification signal (i.e., an increment or decrement signal) to change a duty cycle of at least one switch of the power train of the power converter based on a difference between the output voltage $V_{out}$ of the power converter and the desired system voltage $V_{system}$.

For example, if the output voltage $V_{out}$ of the power converter is larger than the desired system voltage $V_{system}$ by a certain percentage, then the duty cycle encoder produces a corresponding combination of signals indicating a particular reduction in the duty cycle. The modification to the duty cycle produced by the duty cycle encoder does not have to be proportional to the error in the output voltage $V_{out}$ of the power converter. As an example, a sparse ADC employing five comparators operative with unevenly spaced steps (i.e., discrete steps) for the error signals may provide six possible duty cycle increments and decrements (e.g., scaled as 32, 8, 1, −1, −8, and −32) representing disproportionate modifications to the duty cycle for various errors in the output voltage $V_{out}$ as produced by the five comparators.

A TABLE provided below provides an example for a comparator bank employing five comparators indicating relative increments and decrements of a duty cycle depending on the possible combinations of the errors signals $E_1, \ldots, E_5$ from the comparators. The TABLE includes the error signals $E_1, \ldots, E_5$ from the comparators, a modification to the duty cycle (represented by $\Delta D$), and a 2's complement representation of a modification to the duty cycle (represented by $O_0, \ldots, O_7$).

TABLE

| $E_1$ | $E_2$ | $E_3$ | $E_4$ | $E_5$ | $\Delta D$ | $O_7$ | $O_6$ | $O_5$ | $O_4$ | $O_3$ | $O_2$ | $O_1$ | $O_0$ |
|---|---|---|---|---|---|---|---|---|---|---|---|---|---|
| 0 | 0 | 0 | 0 | 0 | 32 | 0 | 0 | 1 | 0 | 0 | 0 | 0 | 0 |
| 0 | 0 | 0 | 0 | 1 | 8 | 0 | 0 | 0 | 0 | 1 | 0 | 0 | 0 |
| 0 | 0 | 0 | 1 | 1 | 1 | 0 | 0 | 0 | 0 | 0 | 0 | 0 | 1 |
| 0 | 0 | 1 | 1 | 1 | −1 | 1 | 1 | 1 | 1 | 1 | 1 | 1 | 1 |
| 0 | 1 | 1 | 1 | 1 | −8 | 1 | 1 | 1 | 1 | 1 | 0 | 0 | 0 |
| 1 | 1 | 1 | 1 | 1 | −32 | 1 | 1 | 1 | 0 | 0 | 0 | 0 | 0 |

Typically, the combination of error signals $E_1, \ldots, E_5$ from the comparators is limited to recognizing a monotonic sequence of voltages from the taps of the resistor divider and the configuration of the circuit. Again, for the case of a comparator bank employing five comparators, six possible output combinations or modifications to the duty cycle are described in the TABLE (i.e., $\Delta D$ equaling 32, 8, 1, −1, −8, −32). The 2's complement representation of the modification to the duty cycle provides a convenient manner of representing numerical values digitally in anticipation of further numerical processing such as in conjunction with a full adder of the duty cycle processor as described below.

Figure 5:
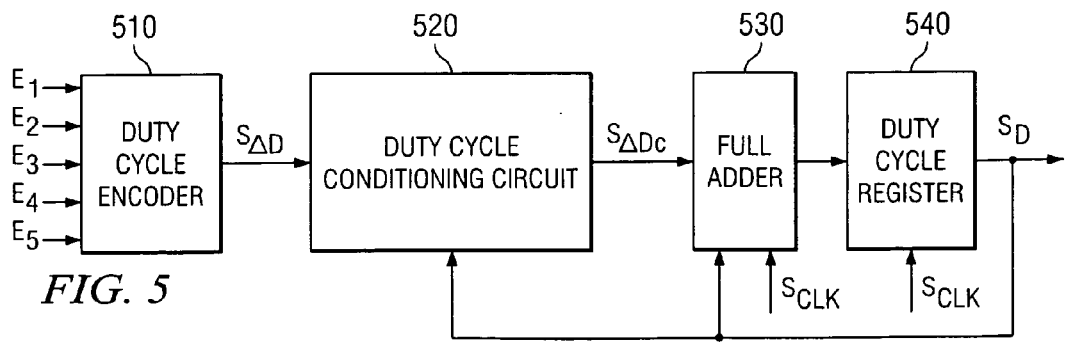
FIG. 5 illustrates a block diagram of an embodiment of a duty cycle processor constructed according to the principles of the present invention.

Turning now to FIG. 5, illustrated is a block diagram of an embodiment of a duty cycle processor constructed according to the principles of the present invention. The duty cycle processor includes a duty cycle encoder 510, a duty cycle conditioning circuit 520, a full adder 530 and a duty cycle register 540. The duty cycle encoder 510 produces a modification signal $S_{\Delta D}$ (i.e., an increment or decrement signal) to change a duty cycle of at least one switch of a power train of a power converter based on a difference between two signals such as an output characteristic of the power converter and a desired characteristic. The duty cycle encoder 510 is preferably a logic circuit that converts combinations of comparator outputs from a sparse ADC as described above into changes in the duty cycle for at least one switch of the power converter.

The duty cycle conditioning circuit 520 examines the modification signal $S_{\Delta D}$ and the present duty cycle for a switch of the power train of the power converter to test an admissibility thereof. If the prospective change to the duty cycle is admissible in view of the present duty cycle, then the modification to the duty cycle is allowable and the duty cycle conditioning circuit 520 produces a conditioned modification signal $S_{\Delta Dc}$. Otherwise, the modification to the duty cycle is adjusted to meet any limitation in duty cycle for the power converter. For example, if the present duty cycle is 0.5 and the prospective change is 0.1, then the modification to the duty cycle is allowable and the duty cycle conditioning circuit 520 produces a conditioned modification signal $S_{\Delta Dc}$. Conversely, if the present duty cycle is 0.95 and the prospective change is 0.1, then the modification to the duty cycle is not allowable and an adjustment to the duty cycle is maintained within the limitations allowable therefor.

The conditioned modification signal $S_{\Delta Dc}$ is coupled to a digital processing sequence including the full adder 530 and the duty cycle register 540. The full adder 530 operating in conjunction with the duty cycle register 540 modifies and stores contents in a register containing a duty cycle computed in the previous clock cycle to produce a digital duty cycle signal $S_D$ to control a duty cycle of at least one switch of the power train of the power converter. Thus, the full adder 530 and duty cycle register 540 are operative to accumulate cycle-by-cycle changes to the duty cycle so that a signal can be derived therefrom to control the duty cycle of at least one switch of the power converter.

The add and store operations are gated by a clock signal $S_{CLK}$ that may be one-thirtieth of a switching frequency of the power converter. The clock signal $S_{CLK}$ that gates the full adder 530 and the duty cycle register 540 can be derived from an external source or can be derived from a clock that provides the switching frequency for the power converter. Since the ultimate modification to the duty cycle is limited by, for instance, the values in the TABLE above and the duty cycle register 540 is incremented or decremented at a rate controlled by the clock, the rate of change of the duty cycle is thereby limited. A benefit of the resistance to change is that an automatic ramp limiting duty cycle modification during startup is inherently provided that might otherwise have been provided in other power converter designs by an additional process.

Thus, a controller for, and related method of, controlling a duty cycle for at Jeast one switch of a power convener with readily attainable and quantifiable advantages has been introduced. Those skilled in the art should understand that the previously described embodiments of the controller, related method, and power converter employing the same are submitted for illustrative purposes only and that other embodiments capable of changing a duty cycle of at least one switch of a power converter employing discrete steps axe well within the broad scope of the present invention. Additionally, in an advantageous embodiment, a power converter constructed accordingly to the principles of the present invention may be embodied in an integrated circuit. Alternatively, portions of the power converter such as the controller and the power train (or portions thereof) may also be embodied in an integrated circuit and still be within the broad scope of the present invention. In accordance therewith, selected switches or other devices of the power converter may be embodied in a semiconductor device as disclosed in U.S. Patent Application Publication No. 2005/0167756, entitled "Laterally Diffused Metal Oxide Semiconductor Device and Method of Forming the Same," to Lofti, et al., which is incorporated herein by reference.

The controller includes a sparse analog-to-digital converter with fewer components that performs rapid analog to digital signal conversion. The sparse analog-to-digital converter preserves the accuracy of the converted signal when a signal is proximate a desired value, and recognizes substantial differences when the signal deviates further. In addition, a set of digital signals from the sparse analog-to-digital converter is employed to generate a duty cycle for at least one switch of the power converter with less complex signal processing and elements that can perform expedient duty cycle computation. As a result, a controller with few systems, subsystems, circuits and components can meet the needs of high performance power converters with low cost and small board area, and thereby provide a competitive alternative to an analog controller.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power converters. While the controller has been described in the environment of a power converter, those skilled in the art should understand that the controller and related principles of the present invention may be applied in other environments or applications such as a power amplifier, motor controller, and a system to control an actuator in accordance with a stepper motor or other electromechanical device.

For a better understanding of digital control theory in power converters see "An Energy/Security Scalable Encryption Processor Using an Embedded Variable Voltage DC/DC Converter," by John Goodman, Abram P. Dancy and Anantha P. Chandrakasan, IEEE Journal of Solid-State Circuits, Vol. 33, No. 11 (November 1998). For a better understanding of power converters, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Although the present invention has been described in detail, those skilled in the art should understand that they can make various changes, substitutions and alterations herein without departing from the spirit and scope of the invention in its broadest form.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for use with a power train of a power converter including a switch configured to conduct for a duty cycle and provide a regulated output characteristic at an output thereof, comprising:
   a sparse analog-to-digital converter configured to determine a difference between said output characteristic and a desired characteristic and provide an error signal representing said difference in discrete steps, a magnitude of said discrete steps being small when said difference is small and a magnitude of said discrete steps being larger when said difference is larger; and
   a duty cycle processor configured to provide a digital duty cycle signal to control said duty cycle of said switch as a function of said error signal.

2. The controller as recited in claim 1 wherein said sparse analog-to-digital converter comprises a resistor divider configured to provide at least one scaled representation of said desired characteristic.

3. The controller as recited in claim 1 wherein said sparse analog-to-digital converter further comprises a comparator bank configured to provide said error signal.

4. The controller as recited in claim 1 wherein said duty cycle processor comprises a duty cycle encoder configured to provide a modification signal representing a change to said duty cycle as a function of said error signal.

5. The controller as recited in claim 4 wherein said duty cycle processor further comprises a duty cycle conditioning circuit configured to provide a conditioned modification signal as a function of said modification signal from said duty cycle encoder.

6. The controller as recited in claim 5 wherein said duty cycle processor further comprises a full adder and a duty cycle register configured to provide said digital duty cycle signal as a function of said conditioned modification signal from said duty cycle conditioning circuit.

7. The controller as recited in claim 1 further comprising a digital-to-analog converter configured to transform said desired characteristic from a digital format to an analog format employable by said sparse analog-to-digital converter.

8. The controller as recited in claim 1 further comprising a modulator configured to convert said digital duty cycle signal into a signal to control said duty cycle of said switch of said power converter.

9. A method of controlling a duty cycle of a switch to provide a regulated output characteristic at an output of a power converter, comprising:

determining a difference between said output characteristic and a desired characteristic and providing an error signal representing said difference in discrete steps, a magnitude of said discrete steps being small when said difference is small and a magnitude of said discrete steps being larger when said difference is larger; and providing a digital duty cycle signal to control said duty cycle of said switch as a function of said error signal.

10. The method as recited in claim 9 wherein said determining comprises providing at least one scaled representation of said desired characteristic and providing said error signal therefrom.

11. The method as recited in claim 9 wherein said providing comprises providing a modification signal representing a change to said duty cycle as a function of said error signal.

12. The method as recited in claim 11 wherein said providing further comprises providing a conditioned modification signal as a function of said modification signal.

13. The method as recited in claim 12 wherein said providing further comprises modifying and storing contents of a duty cycle register to provide said digital duty cycle signal as a function of said conditioned modification signal.

14. The method as recited in claim 9 further comprising transforming said desired characteristic from a digital format to an analog format employable by said act of determining.

15. The method as recited in claim 9 further comprising converting said digital duty cycle signal into a drive signal for said switch of said power converter.

16. A power converter, comprising:
a power train including a switch configured to conduct for a duty cycle and provide a regulated output characteristic at an output of said power converter; and
a controller, including:
a sparse analog-to-digital converter configured to determine a difference between said output characteristic and a desired characteristic and provide an error signal representing said difference in discrete steps, a magnitude of said discrete steps being small when said difference is small and a magnitude of said discrete steps being larger when said difference is larger, and
a duty cycle processor configured to provide a digital duty cycle signal to control said duty cycle of said switch as a function of said error signal.

17. The power converter as recited in claim 16 wherein said sparse analog-to-digital converter comprises:
a resistor divider configured to provide at least one scaled representation of said desired characteristic, and
a comparator bank configured to provide said error signal.

18. The power converter as recited in claim 16 wherein said duty cycle processor comprises:
a duty cycle encoder configured to provide a modification signal representing a change to said duty cycle as a function of said error signal,
a duty cycle conditioning circuit configured to provide a conditioned modification signal as a function of said modification signal from said duty cycle encoder, and
a full adder and a duty cycle register configured to provide said digital duty cycle signal as a function of said conditioned modification signal from said duty cycle conditioning circuit.

19. The power converter as recited in claim 16 wherein said controller further comprises a digital-to-analog converter configured to transform said desired characteristic from a digital format to an analog format employable by said sparse analog-to-digital converter.

20. The power converter as recited in claim 16 wherein said controller further comprises a modulator configured to convert said digital duty cycle signal into a signal employable by a driver to provide a drive signal to said switch of said power converter.

* * * * *